United States Patent [19]

Suzuki et al.

[11] 4,393,732
[45] Jul. 19, 1983

[54] ABNORMALITY TREATMENT DEVICE FOR AUTOMATIC TRANSMISSION CONTROL DEVICE

[75] Inventors: Tadashi Suzuki; Norimasa Kishi, both of Yokosuka, Japan

[73] Assignee: Nissan Motor Co., Ltd., Yokohama, Japan

[21] Appl. No.: 190,071

[22] Filed: Sep. 23, 1980

[30] Foreign Application Priority Data

Sep. 28, 1979 [JP] Japan ............... 54-124816
Sep. 28, 1979 [JP] Japan ............... 54-124817
Sep. 28, 1979 [JP] Japan ............... 54-124818
Sep. 28, 1979 [JP] Japan ............... 54-124819

[51] Int. Cl.³ .................. B60K 41/16; F16H 5/64
[52] U.S. Cl. ........................................ 74/866; 74/867
[58] Field of Search .................. 74/866, 867, 868, 869

[56] References Cited

U.S. PATENT DOCUMENTS

| 3,893,472 | 7/1975 | Schuster | 137/116.3 |
|---|---|---|---|
| 3,943,799 | 3/1976 | Sakai et al. | 74/869 |
| 4,233,860 | 11/1980 | Kadelbach | 74/752 A |
| 4,253,348 | 3/1981 | Will | 74/866 |
| 4,365,526 | 12/1982 | Suga et al. | 74/866 |

FOREIGN PATENT DOCUMENTS

| 2036732 | 2/1972 | Fed. Rep. of Germany . |
|---|---|---|
| 2523024 | 12/1975 | Fed. Rep. of Germany . |
| 2700548 | 7/1978 | Fed. Rep. of Germany . |
| 2715553 | 10/1978 | Fed. Rep. of Germany . |
| 3013258 | 10/1980 | Fed. Rep. of Germany . |
| 1103052 | 2/1968 | United Kingdom . |
| 1266654 | 3/1972 | United Kingdom . |
| 1293050 | 10/1972 | United Kingdom . |
| 1297460 | 11/1972 | United Kingdom . |
| 1449909 | 9/1976 | United Kingdom . |
| 1462957 | 1/1977 | United Kingdom . |
| 1484360 | 9/1977 | United Kingdom . |
| 1492523 | 11/1977 | United Kingdom . |
| 1511722 | 5/1978 | United Kingdom . |

Primary Examiner—Allan D. Herrmann
Attorney, Agent, or Firm—Lane, Aitken & Kananen

[57] ABSTRACT

An abnormality treatment device for an automatic transmission control device according to the invention comprises in input portions of signals from an engine load sensor, a vehicle speed sensor and a pressure sensor, abnormal value detection circuits for detecting any abnormal value of at least one of the signals from the sensors to generate an abnormality detection signal, and a speed range selection judgement circuit and a hydraulic control judgement circuit for generating respective abnormality treatment signals when receiving the abnormal detection signal, thereby maintaining a predetermined speed range and a predetermined high line pressure.

9 Claims, 20 Drawing Figures

Manual Lever Position Signal Abnormal Value Detection Circuit

ABNORMALITY TREATMENT DEVICE FOR AUTOMATIC TRANSMISSION CONTROL DEVICE

BACKGROUND OF THE INVENTION

1. Field of the Invention

The present invention relates to an abnormality treatment device for a control device for an automatic transmission, and more particularly to an abnormality treatment device capable of preventing a danger to enable a vehicle to travel continuously when there is any abnormality in an electronic control device for electrically treating a hydraulic pressure control for an automatic transmission whose power transmission passage of a speed change gear mechanism is changed to change speeds by means of hydraulically operated friction elements and a speed change judgement for exchanging hydraulic pressure supply to the friction elements. This invention relates also to an abnormal value detection device for detecting an abnormality of signals corresponding to engine loads and vehicle speeds for an electronic control device which electrically detects the engine loads and vehicle speeds to carry out a speed change judgement in a speed range selection judgement circuit with the aid of the detected values, and more particularly to an abnormality judgement device for detecting abnormality of signals for a line pressure control device which detects hydraulic pressure (line pressure) which actuates friction means for changing power transmission passage of a speed change gear mechanism to control the detected hydraulic pressure so as to be a hydraulic pressure value corresponding to an engine load.

2. Description of the Prior Art

A hitherto used automatic transmission and an electronic control device therefor will be summarily explained hereinafter.

FIG. 1a illustrates a power transmission system for an automatic transmission of three forward and one reverse speeds hitherto used. A torque converter comprises a pump impeller 104 connected to an engine crankshaft 101, a turbine runner 103 connected to an input shaft 107 and a stator 102 secured to a stationary portion through a one-way clutch 105 for transmitting a rotating torque to a planetary gear mechanism 120. The planetary gear mechanism 120 consists of two planetary gear sets and five friction elements. The two planetary gear sets have been known and consist of the following rotating members, i.e. a front carrier 112, a rear carrier 112', a front internal gear 111, a rear internal gear 111', a front pinion 114, a rear pinion 114', and a sun gear 113 as shown in FIG. 1a. The friction elements consist of a band brake 108 for fixing the sun gear 113 when the band brake 108 is actuated, a front clutch 109 for connecting and disconnecting an intermediate shaft 107 driven by a torque converter 100 with the sun gear 113 for transmitting power therebetween, a rear clutch 110 for transmitting and interrupting power from the intermediate shaft 107 to the front internal gear 111, a low and reverse brake 115 for fixing the rear carrier 112' when the brake 115 is actuated, and a one-way clutch 105 for permitting the rear carrier 112' to rotate in the same direction as the rotating direction of the engine crankshaft 101. The rotating torque is transmitted from the planetary gear mechanism 120 to an output shaft 118. An oil pump 106 supplies operating oil to the torque converter 100, the respective bearings and gears, the friction elements 108, 109, 110 and 115 and a hydraulic circuit later described. A parking pole 116 is in mesh with a tooth 117 of a parking gear to fix the output shaft 118 when a shaft lever later described is in a P (parking) range.

FIG. 1b illustrates a hydraulic control circuit for supplying a hydraulic pressure to the friction elements of the automatic transmission of FIG. 1a.

In the drawing of FIG. 1b, parts of lines which are at the same pressures have been designated by the same reference numerals for the sake of clarity. As the operating principles of the respective valves of this circuit have been known, they will be not described in more detail.

A constant pressure valve (pressure regulator valve) 131 maintains the operating hydraulic pressure delivered from the oil pump 106 at a desired pressure (line pressure 6). The hydraulic oil delivered from the oil pump 106 passes through a passage 18 and acts on a land 131a of a valve spool to push it downwardly against a force of a valve spring 131b and thereafter is drained through a drain port designated by x. This action is repeated until the line pressure is balanced by the force of the spring 131b and maintained. A line 20 is in communication with the torque converter 100 to keep the inside of the converter 100 at a desired pressure while part of the operating oil is supplied through a ball valve to the front clutch 109 and rear clutch 110 for their lubrication.

When an acceleration pedal (not shown) is pressed down, a throttle pressure 15 rises and acts on an underside of one land of a plug 131c to assist the force of the spring 131b in raising the valve spool, thereby reducing a clearance for the drain port x to cause the line pressure 6 to rise.

When a manually operated valve 132 later described is operated into an R (reverse) range, the line pressure 6 from a line 5 acts on the lower surface of the other land of the plug 131c so as to assist the force of the spring 131b to further increase the line pressure 6 in the same manner as above described.

The manually operated valve 132 has a valve spool 132a mechanically connected to a manual lever (not shown) so as to be reciprocatively moved to distribute the line pressure 6 through lines 1, 2, 3, 4 and 5 as follows.

line 1→1-2 shift valve 133, 2-3 shift valve 134 and rear clutch 110 line 2→2-3 shift valve 134 line 3→throttle back up valve 136 line 4→emergency valve 137 line 5→pressure regulator valve 131 and 1-2 shift valve 133

These lines receive the line pressure 6 in response to respective operating positions (ranges) of the manual lever as shown in Table 1.

TABLE 1

| Line | Position of shift lever | | | | | |
|---|---|---|---|---|---|---|
| | P | R | N | D | II | I |
| 1 | | | | o | o | o |
| 2 | | | | o | o | |
| 3 | o | o | | | o | o |
| 4 | o | o | | | | o |
| 5 | | o | | | | |

As can be seen from the Table 1, moreover, when the shift lever is in an N (neutral) position, all the line pressure 6 is drained through drain ports x.

A line pressure regulator valve (vacuum throttle valve) 135 forms the line pressure 6 into a throttle pressure 15 in proportion to an engine load, which acts on a land 131d of the valve spool of the constant pressure valve 131 to regulate the line pressure 6 in proportion to the engine load. The line pressure regulator valve 135 has a valve spool 135a connected to and operated by a diaphragm type actuator 140 which is actuated by negative pressure. When the negative pressure acting upon a diaphragm 140a of the actuator 140 is at a small value (the engine load is large), the valve spool 135a is in its lowered position (as shown in the right half of the spool in the drawing) as the result of a lowering action of a spring 140b of the actuator 140, so that the line pressure 6 is fed as the throttle pressure 15 into the constant pressure valve 131 to obtain a high line pressure 6. When the negative pressure acting upon the diaphragm 140a of the actuator 140 is at a large value (the engine load is small), the valve spool 135a is raised by the diaphragm 140a into its raised position (as shown in the left half of the spool in the drawing), so that the line pressure 6 becomes lower by a value corresponding to the pressure flowing into the line 16 and is fed as the throttle pressure 15 into the constant pressure valve 131 to obtain a low line pressure 6.

An intake manifold negative pressure of an engine is introduced through a check valve into a negative pressure tank 138 and retained therein, from which the negative pressure is further introduced to the diaphragm 140a of the actuator 140 through a solenoid valve 144 adapted to open when a current is supplied. To the diaphragm 140a furthermore the atmosphere is introduced through a solenoid valve 143 which introduces the atmosphere when a current is supplied. Both solenoid valves 143 and 144 are so controlled that the negative pressure acting upon the diaphragm 140a corresponds to the engine load in a manner that the larger the engine load, the smaller is the negative pressure acting upon the diaphragm 140a, thereby enabling the throttle pressure 15 to correspond to the engine load.

At a moment when the manually operated valve 132 is shifted from the D range to II or I range, the line pressure 6 is fed through a line 3 into the throttle back up valve 136 to raise a valve spool 136a against a force of a spring 136b to a level shown in the left half of the spool in the drawing, thereby producing a back up pressure 16 lower than the line pressure 6 while part of the line pressure 6 is being drained through a drain port shown at x. When the valve spool 135a of the pressure regulator valve (vacuum throttle valve) 135 is at its raised position, this back up pressure 16 acts as a throttle pressure 15 upon the constant pressure valve (pressure regulator valve) 131 to obtain a high line pressure 6, thereby preventing any delay in operation of the brake band 108 or low and reverse brake 115.

In addition, with the spool 132a of the manually operated valve 132 in I range, when the later described 1-2 shift valve 133 has shifted toward a first speed side, the line pressure 6 is fed from the manually operated valve 132 through a line 1 to a line 8. With the spool 132a in I range, moreover, the line pressure 6 from the manually operated valve 132 through a line 4 acts on a valve spool 137a of the later described emergency valve 137 to lower it as shown in the left half of the valve spool in the drawing. The line pressure 6 fed into the line 8 as above described is therefore introduced into a line 9. In this manner, the line pressure 6 through the line 9 raises the valve spool 136a of the throttle back up valve 136 to the uppermost position to communicate the line 16 with the drain port at x, thereby preventing an occurrence of a back up pressure 16 so as not to produce an excess line pressure.

In addition to the above case of I (first speed) range of the manually operated valve, with R (reverse) range the valve spool 137a of the emergency valve 137 is also at the depressed position. With the R range of the spool of the valve 132, therefore, the line pressure from the manually operated valve 132 is fed through a line 5 into a line 19, thereby actuating the front clutch 109 to release the brake band 108.

With ranges of the manually operated valve 132 other than N (neutral), P (parking) and R (reverse) ranges, the line pressure 6 always supplied through the line 1 is drained through an orifice 133a or 134a when a current is supplied to a 1-2 shift solenoid 141 or 2-3 shift solenoid 142 to maintain a spool 133c of the 1-2 shift valve 133 or a spool 134c of the 2-3 shift valve 134 at a location shown in the right half of the spool in the drawing. When a current is supplied to the shift solenoid 141 or 142, however, the orifice 133a or 134a is closed to cause the line pressure to act on an upper end of the valve spool 133c or 134c, thereby lowering the valve spool to the position shown in the left half of the valve spool in the drawing to supply the pressure to the respective friction elements (rear clutch 110, brake bank 108 and low and reverse brake 115).

Combinations of operations of the shift solenoids and friction elements with the manually operated valve 132 in the respective operating positions are shown in Table 2.

TABLE 2

| Operated position (Range) | | Shift solenoid | | Clutch | | Low and reverse brake 115 | Band servo 108 | | One way clutch |
|---|---|---|---|---|---|---|---|---|---|
| | | 1-2 141 | 2-3 142 | Front 109 | Rear 110 | | Actuation | Release | |
| | P | OFF | OFF | | | o | | | |
| | R | OFF | OFF | o | | o | | o | |
| | N | OFF | OFF | | | | | | |
| D | 1st speed | ON | ON | | o | | | | o |
| | 2nd speed | OFF | ON | | o | | o | | |
| | 3rd speed | OFF | OFF | o | o | | o | o | |
| 2 | 2nd speed | OFF | ON | | o | | o | | |
| | 3rd speed | OFF | OFF | o | o | | o | o | |

TABLE 2-continued

| Operated position (Range) | Shift solenoid 1-2 141 | Shift solenoid 2-3 142 | Clutch Front 109 | Clutch Rear 110 | Low and reverse brake 115 | Band servo 108 Actuation | Band servo 108 Release | One way clutch |
|---|---|---|---|---|---|---|---|---|
| 1  1st speed | ON | OFF |  | o |  | o |  |  |
|    2nd speed | OFF | OFF |  | o | o |  |  |  |

In Table 2, ON and OFF mean the supply of current and not supply of current, respectively, and circles indicate the operations of the relevant elements. The band servo or brake band 108 is released in view of pressure receiving areas when a hydraulic pressure acts regardless of the actuation and release.

An electronic control device for controlling the above automatic transmission will be explained hereinafter wherein after determining a gear changing position depending upon an engine load and a vehicle speed, the shift solenoids 141 and 142 are energized or deenergized, while the negative pressure acting upon the actuator 140 is controlled by energizing or deenergizing the atmosphere solenoid 143 and negative pressure solenoid 144 to maintain the required line pressure.

As an embodied circuit arrangement of the electronic control device is not essential for an understanding of the invention, it will not be described in further detail, but only its control system will be explained. Circuit arrangements may be used for this purpose, which have been proposed by Nissan Motor in Japanese Patent Applications Nos. 41,345/79 and 39,351/79, corresponding, respectively, to U.S. patent application Ser. Nos. 136,337 filed Apr. 1, 1980, and 134,986 filed Mar. 28, 1980.

FIG. 2 illustrates an outline of the electronic control device 208 consisting of a speed range selection judgement circuit 209 for determining speed ranges by energizing and deenergizing the shift solenoids 141 and 142 and a hydraulic control judgement circuit 210 for controlling the line pressure by energizing and deenergizing the atmosphere solenoid 143 and the negative pressure solenoid 144.

The speed range selection judgement circuit 209 receives a manual lever position signal (D range signal 202, II range signal 203 or I range signal 204) to select a speed change line representative of a relation between the engine load and vehicle speed as shown in FIGS. 3a and 3b and compares the speed change line with a vehicle speed signal 205 and an engine load signal 206 to determine a speed change range and thereafter produces an output signal 141' or 142' to energize or deenergize the shift solenoid 141 or 142.

The speed change lines in FIG. 3a are for the D range and the speed change lines in FIG. 3b are for the II and I ranges. For example, with the D range in FIG. 3a, if a vehicle speed increases from x₁ to x₂ with a constant engine load, at a moment when the vehicle speed crosses a speed change line a, the speed range is changed from the first range to second range. A speed change line b determines the speed change from the second range to third range in the same manner. Speed changes from the second to the first and from the third to second are determined by the speed change lines a' and b' which are positioned on lower vehicle speed sides as can be seen from FIG. 3a which result from a hysteresis in a down-shift. With the II and I ranges, speed changes are also effected by the use of speed change lines d, d' and c, c' in FIG. 3b in the same manner.

The hydraulic control judgement circuit 210 receives the engine load signal 206 and a line pressure signal 207 corresponding to a line pressure to compare the line pressure value of the line pressure signal 207 with a line pressure value corresponding to an engine load obtained from a required line pressure characteristic with the engine load as shown in FIG. 4 to produce an output signal 143' or 144' for energizing or deenergizing the negative pressure solenoid 143 or atmosphere solenoid 144 to operate the hydraulic pressure regulator valve 135 so as to obtain a line pressure corresponding to the engine load. A shaded zone in FIG. 4 is an insensible zone wherein both the solenoids 143 and 144 are not simultaneously energized for preventing a superfluous power consumption.

The above manual lever position signals 202-204 are obtained from sensors such as switches which are adapted to be turned on when the manually operated lever assumes respective positions. The vehicle speed signal 205 is obtained from a sensor such as a reed switch adapted to be repeatedly turned on and off by means of a magnet rotated together with an output shaft of the transmission. The engine load signal 206 is obtained by detecting an open degree of a throttle of the engine by means of a potentiometer type sensor or by detecting a displacement of a diaphragm subjected to an intake manifold negative pressure by means of a potentiometer type sensor. The line pressure signal 207 is obtained by detecting a displacement of a diaphragm directly subjected to the hydraulic pressure by means of a potentiometer or detecting a displacement of a diaphragm subjected to a negative pressure acting upon the actuator 140 of the line pressure regulator valve 135 by means of a potentiometer type sensor.

The hitherto used automatic transmission and electronically controlled circuit therefor are constructed as above described and have encountered the following problems.

When the electronic control circuit 208 is inoperative owing to its failure or a failure of its power source, the shift solenoids 133 and 134 are deenergized so as to be inoperative. In this case, however, the vehicle can be driven by an operation of the manually operated valve 132 at the third speed in D range, second speed in II range or first speed in I range. At this time, the solenoids 143 and 144 of the line pressure regulator valve 135 are deenergized to maintain the line pressure enabling the vehicle to normally travel. However, if the input signals 202-207 to be fed to the electronic control circuit 208 are extraordinary, the following great problems arise with the travelling of the vehicle. Namely, when the lines of the input signals are broken down or short-circuited or the respective sensors have failed, corresponding input signals having extraordinary values are obtained, based upon which an incorrect judgement in speed change or a wrong line pressure control will be effected. In case, for example, that the engine load signal 206 is inputted as a voltage proportional to an engine load, if the signal line is broken down, the engine load is deemed as if it were a light load, so that a shift up to a higher speed range (second or third range) is effected at a low speed even if other input signals are correct. On the other hand, as the line pressure is controlled to a low pressure, so that in an extreme case the friction elements of the transmission are likely to slide, it is often impossible to climb an ascent or to start requiring a great driving torque. If this condition occurs in driving downhill, the friction elements tend to slide due to the low line pressure although the spool of the manually operated valve 132 is shifted to the II range, so that an engine braking cannot be obtained thereby urging a driver to drive dangerously. Moreover, when the vehicle is driven at a constant speed before such a condition occurs, the required torque for such a driving is so small that the driver cannot previously notice the falling of the line pressure. This is dangerous. Furthermore, if the control is effected as if the manually operated lever were in a position different from an actual one owing to a short-circuit of the manual lever position signals 202-204, correct speed changes cannot be obtained. Moreover, if the input signal lines of the vehicle speed signal 205 and line pressure signal 207 are extraordinary, the proper speed change and line pressure control cannot be effected, respectively.

SUMMARY OF THE INVENTION

It is a primary object of the invention to provide an improved abnormality treatment device for a control device for an automatic transmission, which deletes all the disadvantages of the prior art and which comprises, in its input portion of signals from an engine load sensor, a vehicle speed sensor and a pressure sensor, abnormal value detection circuits for detecting any abnormal value of at least one of signals from the sensors to generate an abnormality detection signal, and a speed range selection judgement circuit and a hydraulic control judgement circuit for generating respective abnormality treatment signals when receiving the abnormal detection signal to maintain a predetermined speed range and a predetermined high line pressure.

It is still another object of the invention to provide an abnormality treatment device for an automatic transmission control device, which detects an abnormality of a manual lever position signal which is important for a proper speed range in connection with a speed range selection of a speed range selection judgement circuit, to enable this circuit, with the aid of an abnormality treatment signal when the abnormality is detected, to maintain speed ranges other than those selectable by a manually operated valve.

It is another object of the invention to provide an abnormality judgement device which comprises, in its input portion of signals from a line pressure sensor of an electronic control device, an abnormal value detection circuit for detecting an abnormal value of a line pressure signal to generate an abnormality detection signal.

The invention will be more fully understood by referring to the following detailed specification and claims taken in connection with the appended drawings.

BRIEF DESCRIPTION OF THE DRAWINGS

FIG. 1b is a hydraulic circuit for an electronic speed change control device for the gear train shown in FIG. 1a;

DETAILED DESCRIPTION OF THE PREFERRED EMBODIMENT

Figure 1A:
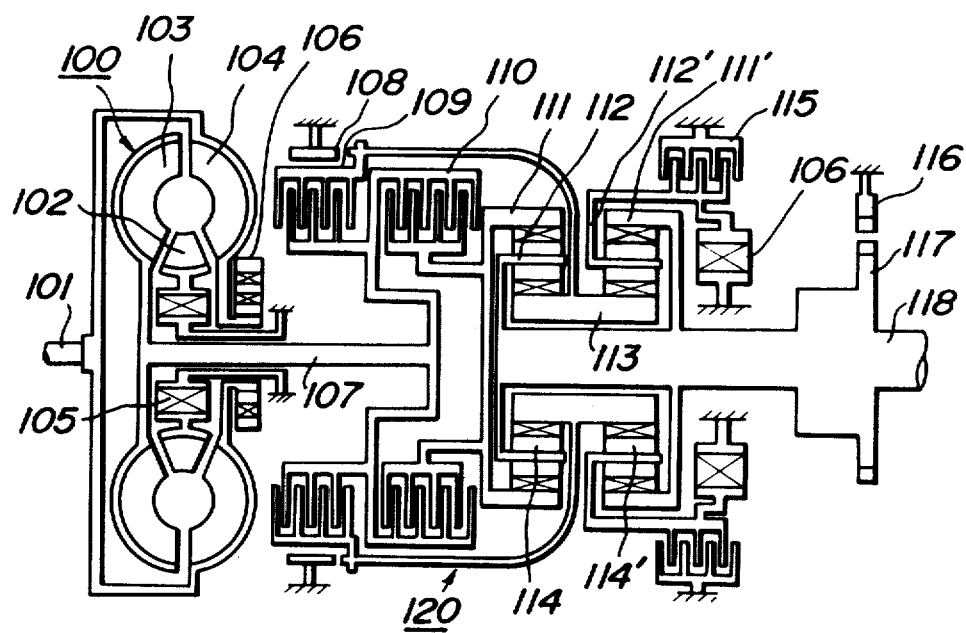
FIG. 1a is a diagrammatic view of a general gear train of an automatic transmission.
Figure 1B:
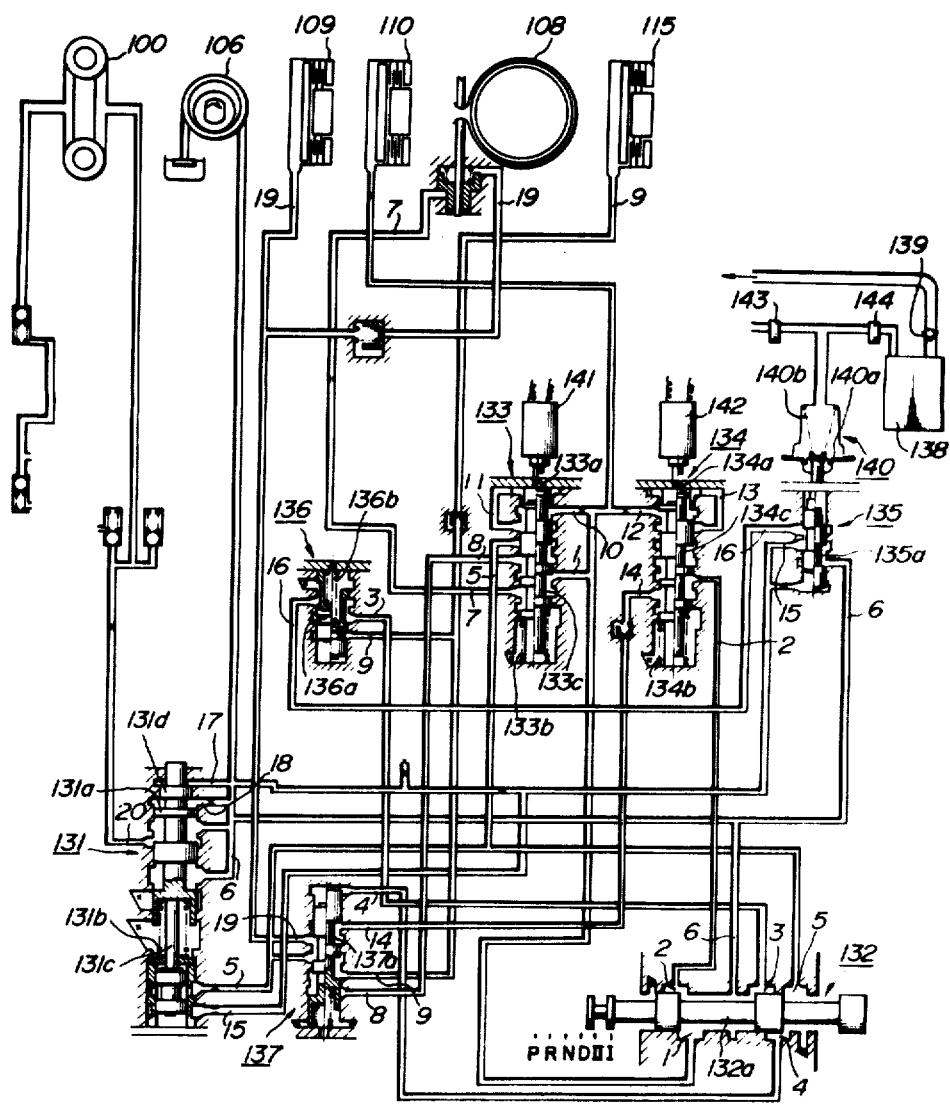
Figure 2:
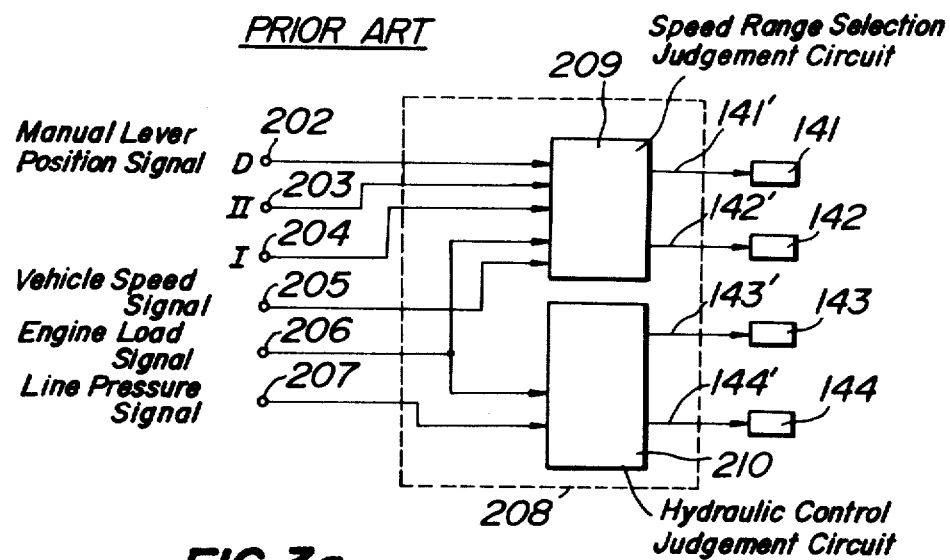
FIG. 2 is a block diagram illustrating an electronic control device of the speed change control device as shown in FIG. 1b.
Figure 5:
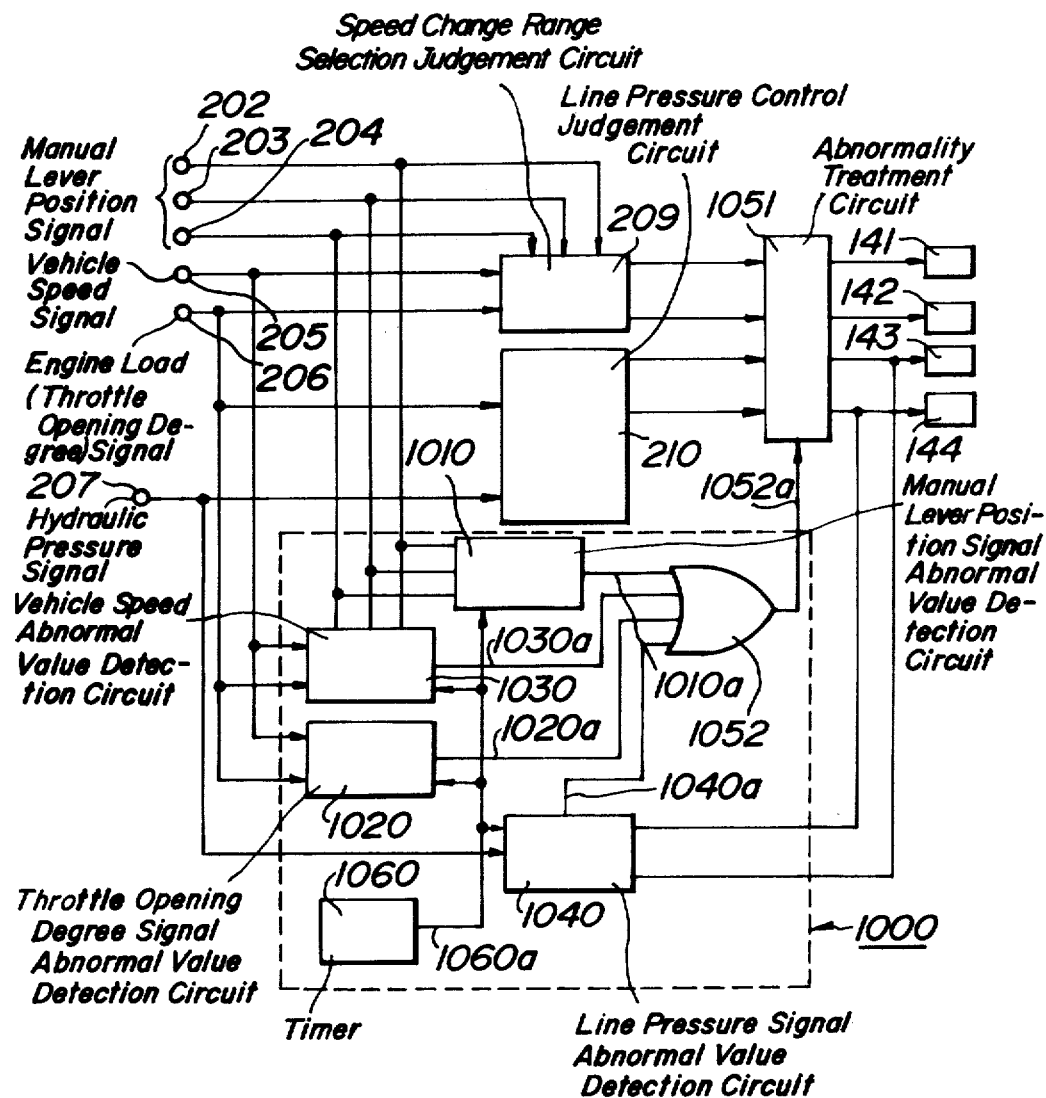
FIG. 5 is a block diagram illustrating the device according to the invention applied to the electronic control device shown in FIG. 2.

FIG. 5 illustrates a first embodiment of an abnormality treatment device for an electronic circuit for an automatic transmission, whose details are illustrated in FIGS. 6-10. In FIG. 5, the same parts as those of the prior art in FIG. 2 are illustrated with the same reference numerals and they are not explained in detail. With this embodiment, the same automatic transmission as that of the prior art in FIG. 1 is used.

In FIG. 5, shift or manual lever position signals corresponding to D, II and I ranges are illustrated by numerals 202-204, among which the signal which corresponds to a selected range is an input signal at a high level (referred to as "1", hereinafter) and other signals which correspond to not selected ranges are input signals at low levels (referred to as "0", hereinafter). A vehicle speed signal 205 is inputted as a voltage corresponding to a vehicle speed. In the same manner, a throttle opening degree signal 206 is inputted as a voltage corresponding to an engine load and a line pressure signal 207 is inputted as a voltage corresponding to a line pressure.

A speed change range selection judgement circuit 209 and a line pressure control judgement circuit 210 generate driving signals to be fed to a 1-2 shift solenoid 141 and 2-3 shift solenoid 142 and driving signals to a negative pressure solenoid 143 and an atmosphere solenoid 144. An abnormal value detection circuit 1000 is provided and the manual lever position signals 202-204, vehicle speed signal 205 and throttle opening signal 206 are inputted in the abnormal value detection circuit 1000 to detect abnormal values of the respective signals and generate abnormal value detection signals 1052a. The abnormal value detection circuit 1000 comprises a manual lever position signal abnormal value detection circuit 1010, a throttle opening degree signal abnormal value detection circuit 1020, a vehicle speed abnormal value detection circuit 1030 and a line pressure signal abnormal value detection circuit 1040, which will be explained in detail later. Outputs 1010a-1040a of these abnormal value detection circuits 1010-1040 are inputted into an OR circuit 1052. If a signal "1" representative of an abnormality is fed from at least one of these circuits, the OR circuit 1052 generates an abnormal value detection signal 1052a "1" which is fed into an abnormality treatment circuit 1051. A timer 1060 supplies clock signals 1060a to the respective abnormal value detection circuits 1010-1040 which operate when the clock signal 1060a is inputted thereinto. When the abnormal value detection signal 1052a is inputted in the abnormality treatment circuit 1051, this circuit 1051 energizes only the atmosphere solenoid 144 but keeps the shift solenoids 141 and 142 and also the negative pressure solenoid 143 deenergized irrespective of the signals from the speed range selection judgement circuit 209 and hydraulic control judgement circuit 210. As can be seen from the above explanation in connection with the automatic transmission shown in FIG. 1, the speed range is kept at third speed and the line pressure is maintained at the high pressure. As the first speed and second speed can be obtained by shifting the spool of the manually operated valve 132 to I range and II range by means of the manually operated lever, all the first to third speeds are manually obtained, thereby enabling the vehicle to run while repairing a failed portion, during which the line pressure is maintained at the high pressure, thereby eliminating any risk of slippage of the friction elements.

Figure 6:
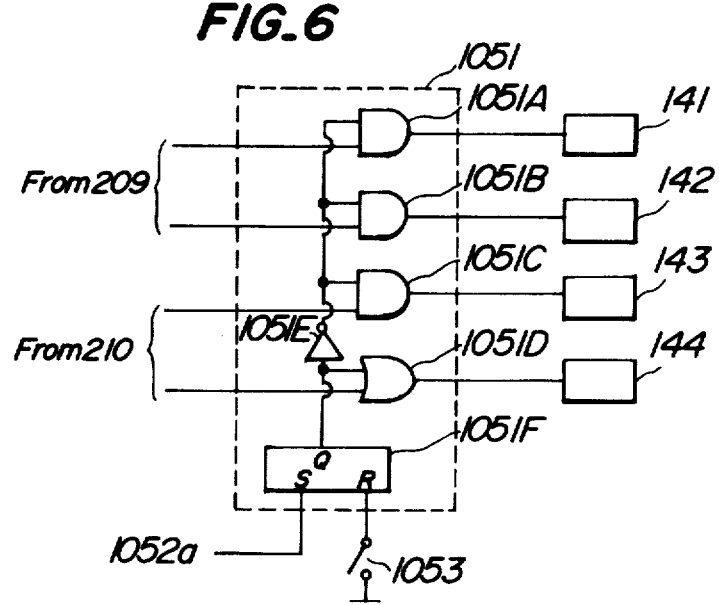
FIG. 6 is a block diagram of an abnormality treatment circuit of the device shown in FIG. 5.

FIG. 6 illustrates an embodied example of the abnormality treatment circuit 1051 which comprises three 2 input AND circuits 1051A-1051C whose respective one input terminals receive the signals from the speed change range selection judgement circuit 209 and line pressure control judgement circuit 210, and a 2 input OR circuit 1051D. Signals from an output terminal Q of a flip-flop circuit 1051F are inputted through an inverter 1051E into the other input terminals of the AND circuits 1051A-1051C and directly into the OR circuit 1051D.

The flip-flop circuit 1051F includes a set terminal S and a reset terminal R, both the terminals being triggered. The set terminal S is triggered at rising edges of an input signal and the reset terminal R is triggered at trailing edges of an input signal. The reset terminal R is connected through an ignition switch 1053 of the engine to a battery and is applied with predetermined voltages from the battery since the switch 1053 is always closed during running of the vehicle. The output 1052a from the OR circuit 1052 is inputted into the set terminal S of the flip-flop circuit 1051F. When the abnormal value detection signal 1052a "1" is inputted in the set terminals S, the flip-flop circuit 1051F produces an output signal "1".

As can be seen from the arrangement as described, the abnormality treatment circuit 1051 operates in the following manner. An abnormal value detection signal 1052a is inputted into the flip-flop circuit 1051F, the circuit generates a signal "1" which is inverted in the inverter 1051E, so that the AND circuits 1051A-1051C deenergize the shift solenoids 141, 142 and negative pressure solenoid 143 irrespective of any other input signals received in the AND circuits. On the other hand, the signal "1" produced from the flip-flop circuit 1051F is directly inputted in the OR circuit 1051D, so that the atmosphere solenoid 144 is energized irrespective of any other signal received in the OR circuit. This condition is maintained until the ignition switch 1053 is opened for stopping the vehicle to reset the flip-flop circuit 1051F.

Figure 7:
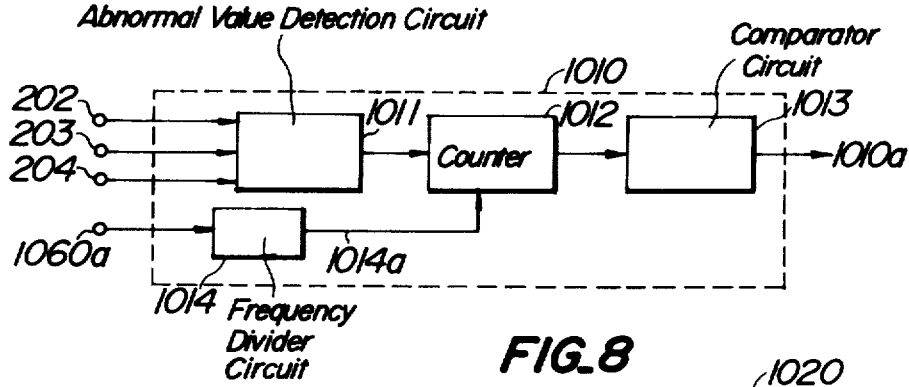
FIG. 7 is a block diagram of a manual lever position signal abnormal value detection circuit of the device shown in FIG. 5.

FIG. 7 exemplarily illustrates an embodied arrangement of the manual lever position signal abnormal value detection circuit 1010. The manual lever position signals 202-204 are inputted into the manual lever position signal abnormal value detection circuit 1011 which is connected together with a frequency divider circuit 1014 receiving a clock signal 1060a to a counter 1012 which is in turn connected to a comparator circuit 1013. The manual lever position signal abnormal value detection circuit 1011 generates a signal "1" when at least two manual lever position signals are "1" or when the detection circuit 1011 detects the fact that at least two positions of the manually operated lever have been selected. The frequency divider circuit 1014 divides the clock signal 1060a into clock signals having a frequency sufficient to detect an abnormality of the shift lever. The count of the counter 1012 is integrated in synchronism with the clock signals 1014a while the detection circuit 1011 produces signals "1". When the output of the counter 1012 reaches a predetermined counter position, the comparator circuit 1013 generates a "1" signal 1010a which is fed to the OR circuit 1052. Such an integrating count to a predetermined counter position by the counter 1012 prevents a wrong abnormality detection wherein two transitional signals "1" of the shift lever during its operation are detected to be extraordinary.

Figure 8:
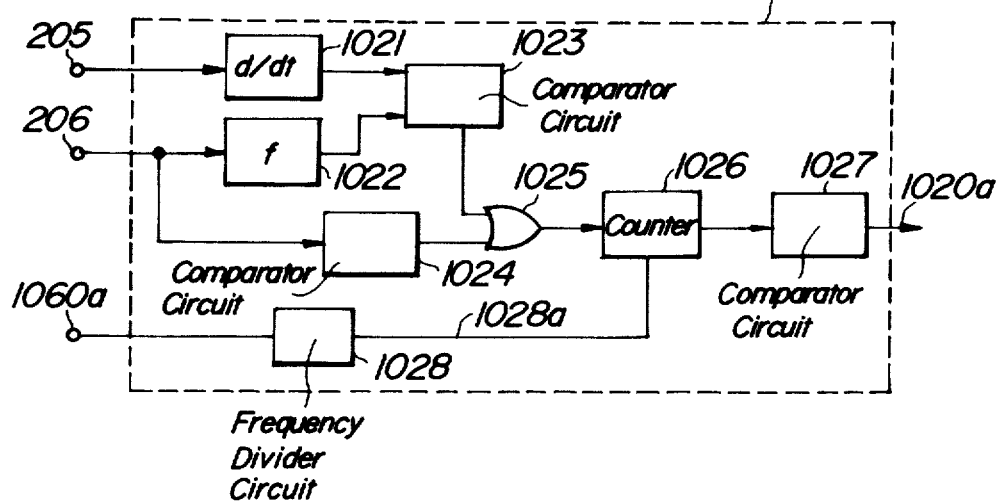
FIG. 8 is a block diagram of a throttle opening degree signal abnormal value detection circuit of the device shown in FIG. 5.

FIG. 8 illustrates an embodied example of the throttle opening degree signal abnormal value detection circuit 1020. The vehicle speed signal 205 is inputted into a differentiating circuit 1021. The throttle opening degree signal 206 is inputted into a function set circuit 1022 and a comparator circuit 1024. The clock signal 1060a is inputted into a frequency divider circuit 1028. The differentiating circuit 1021 and function set circuit 1022 are connected to a comparator circuit 1023. The comparator circuits 1023 and 1024 are connected to an OR circuit 1025. The OR circuit 1025 and frequency divider circuit 1028 are connected to a counter 1026 which is in turn connected to a comparator circut 1027.

The vehicle speed signal 205 is differentiated in the differentiating circuit 1021 which produces a voltage signal corresponding to an acceleration of the vehicle. The function set circuit 1022 produces a set voltage corresponding to the throttle opening degree signal. The comparator circuit 1023 compares the output signals from the differentiating circuit 1021 and function set circuit 1022 to produce a signal "1" if the output voltage from the differentiating circuit 1021 is more than that from the function set circuit 1022. The comparator circuit 1024 produces a signal "1", when the throttle opening degree signal 206 is not within values corresponding to the maximum and minimum values of the throttle opening degree signals 206. The frequency divider circuit 1028 divides the clock signal 1060a to produce a clock signal 1028a having a suitable period. The counter 1026 accumulatively counts the clock signals 1028a while the signals "1" are outputted from the circuit 1025. The comparator circuit 1027 produces a signal 1020a of "1" which is fed to the OR circuit 1052 when the counted value reaches a predetermined value.

The predetermined maximum and minimum values with which the throttle opening degree signal 206 is compared in the comparator circuit 1024 correspond to the full open and full close of the throttle (which is not completely closed but a slight opening to keep an idling of an engine). In a normal condition, the throttle opening degree signal 206 exhibits only a value between the maximum and minimum values, thereby enabling an abnormality to be detected.

The output voltage value from the function set circuit 1022 corresponds to an acceleration depending upon the throttle opening degree while the vehicle runs on a somewhat abrupt descent or a fairly large acceleration near to the maximum possible acceleration of the vehicle. Such an output voltage value continues only for a short period of time.

Therefore, when the signals from the comparator circuits 1023 and 1024 continue until the counted value of the counter 1026 reaches above the predetermined value, an abnormality can be detected.

Figure 9:
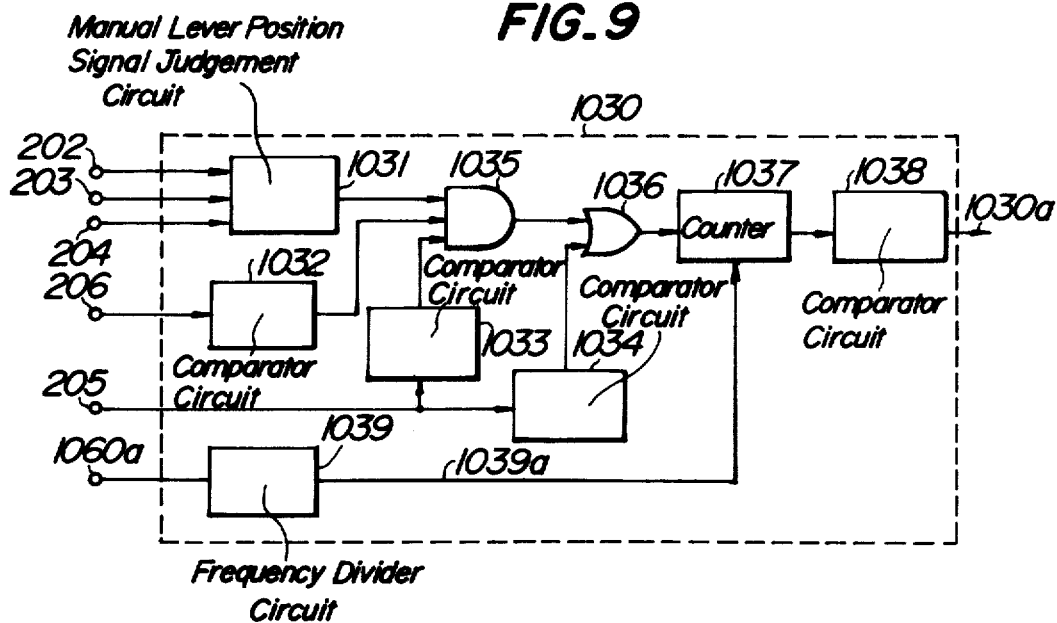
FIG. 9 is a block diagram of a vehicle speed signal abnormal value detection circuit of the device shown in FIG. 5.

FIG. 9 illustrates an example of the embodied vehicle speed signal abnormal value detection circuit 1030. The manual lever position signals 202-204 are inputted in a manual lever position signal judgement circuit 1031 which produces a signal "1" when the circuit 1031 discriminates any selected one of speed ranges D, II and I or when any one of the manual lever position signals 202-204 is "1". A comparator circuit 1032 generates a signal "1" when the throttle opening degree signal 206 is more than a determined value. A comparator circuit 1033 produces a signal "1", when the vehicle speed signal 205 is a value corresponding to the zero vehicle speed. A comparator circuit 1034 produces a signal "1", when the vehicle speed signal 205 exceeds the value corresponding to the maximum vehicle speed. A frequency divider circuit 1039 divides a clock signal 1060a into clock signals 1039a having a suitable period. An AND circuit 1035 receives output signals from the manual lever position signal judgement circuit 1031 and comparator circuits 1032 and 1033 to produce logical products. An OR circuit 1036 receives output signals from the comparator circuit 1034 and AND circuit 1035 to produce logical sums. A counter 1037 performs an accumulative count in synchronism with the clock signal 1039a, while the output signal of the OR circuit 1036 is "1". A comparator circuit 1038 produces a signal 1030a "1", when the counted value of the counter 1037 reaches a predetermined value. With this arrangement, as there is no vehicle speed signal whose value exceeds the maximum vehicle speed, the output signal "1" from the comparator circuit 1034 indicates an abnormality.

When the speed range is in D, II or I and the throttle opening is more than a determined value, a driving force is transmitted to wheels to drive the vehicle. With this condition, therefore, the vehicle speed is never zero, so that the signal "1" from the AND circuit indicates an abnormality.

Figure 10:
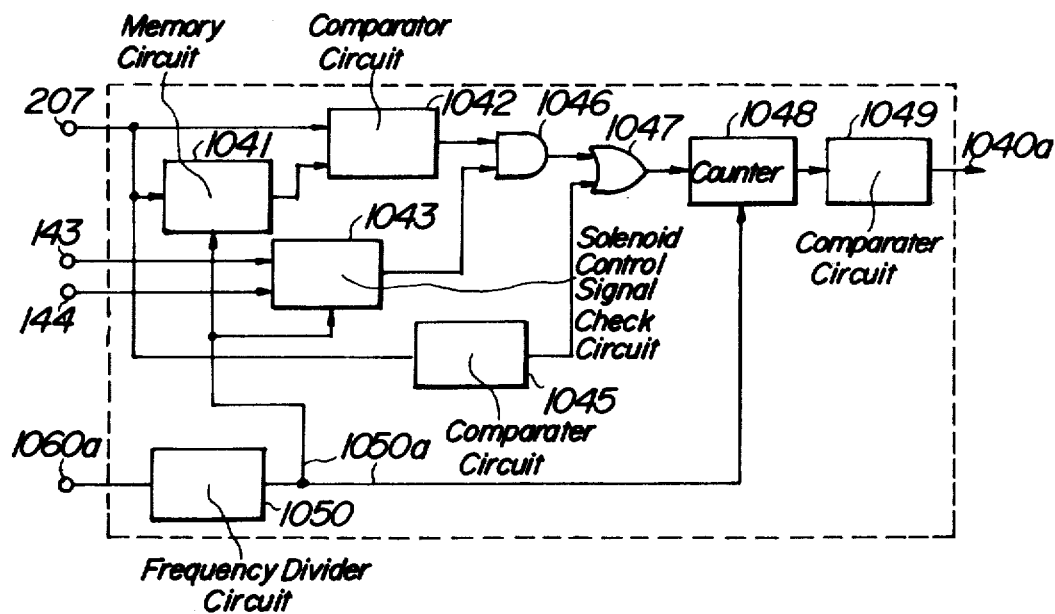
FIG. 10 is a block diagram of a line pressure signal abnormal value detection circuit of the device shown in FIG. 5.

FIG. 10 illustrates an example of the line pressure signal abnormal value detection circuit 1040. In synchronism with clock signals 1050a which are obtained by dividing the clock signal 1060a in a frequency divider circuit 1050, the line pressure signal 207 is sample held in a memory circuit 1041 to obtain a value which is outputted to a comparator circuit 1042. The comparator circuit compares the output value of the memory circuit 1041 with the line pressure signal 207 to produce a signal "1", when these values are not coincident with each other or the line pressure varies. In synchronism with the clock signal 1050a, a solenoid control signal check circuit 1043 generates signals "1", while any one of the shift solenoids 143 and 144 is energized and kept energized. A comparator circuit 1045 produces a signal "1" when the line pressure signal does not lie between the maximum and minimum values. An AND circuit 1046 receives the output signals from the comparator circuit 1042 and solenoid control signal check circuit 1043 to produce logical products. An OR circuit 1047 receives the output signals from the AND circuit 1046 and comparator circuit 1045 to produce logical sums. In synchronism with the clock signal 1050a, a counter 1048 accumulatively counts signals "1" while the OR circuit 1047 produces the signals "1". When the counted value reaches a predetermined value, a comparator circuit produces a signal 1040a of "1". With this arrangement, the comparator circuit 1045 detects the abnormality wherein the line pressure signal is not within the normal values or between the above maximum and minimum values, and the AND circuit 1046 detects the abnormality that the line pressure signal does not vary in the comparator circuit 1042 although there should be a variation in line pressure signal, thereby detecting any abnormality in a line pressure sensor or an input signal line.

As an alternative, the abnormality treatment device according to the invention may employ micro computers in substitution for the above arrangement, which will be explained hereinafter referring to FIGS. 11-17.

Figure 11:
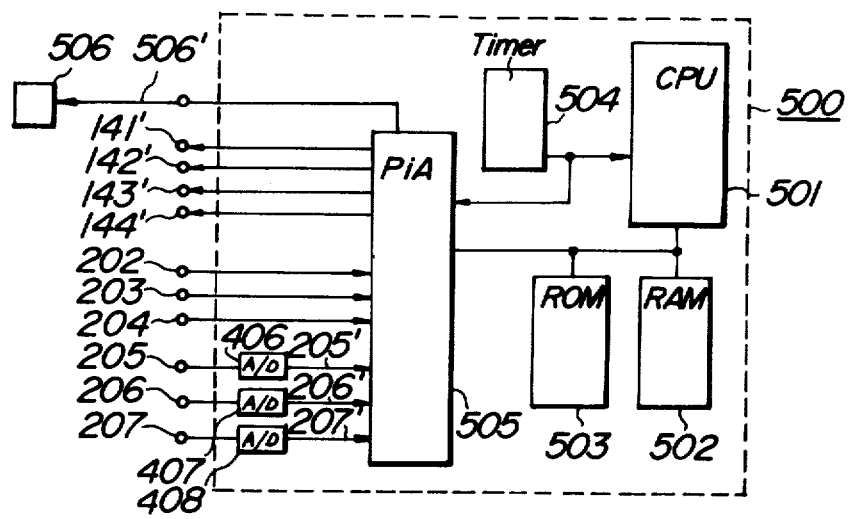
FIG. 11 is a block diagram illustrating another embodiment of the device according to the invention employing micro computers.

In FIG. 11, a reference numeral 500 illustrates a whole control circuit used in the device according to the invention, which carries out a usual speed change range selection judgement control and a line pressure control judgement and a read only memory (ROM) 503 stores a detection of an abnormality and a treatment thereof. In FIG. 11, a reference numeral 501 illustrates a central processing unit (CPU) which operates according to a control program stored in the ROM 503 later described. In synchronism with interruption signals from a timer 504 arranged exterior or in the control program, the CPU 501 causes a random access memory (RAM) 502 to store through an input/output interface circuit (PiA) 505 the manual lever position signals, (D, II and I range signals 202, 203 and 204) as digital signals and binary signals 205', 206' and 207' obtained from an analog-digital converters 406, 407 and 408 for converting the vehicle speed signal 205, engine load signal 206 and line pressure signal 207 as analog signals into digital signals, thereby effecting the speed change range selection judgement, line pressure control judgement and abnormality detection and its treatment to produce through the input/output interface circuit (PiA) 505 shift solenoid control signals 141' and 142' for controlling the energization of the 1-2 and 2-3 shift solenoids 141 and 142, line pressure control signals 143' and 144' for controlling the energization of the negative pressure solenoid 143 and atmosphere solenoid 144 and monitor signals 506' to an external monitor 506.

Flow charts of the control programs stored in the ROM 503 in the control circuit 500 will be explained referring to FIGS. 12 and 13.

Figure 3A:
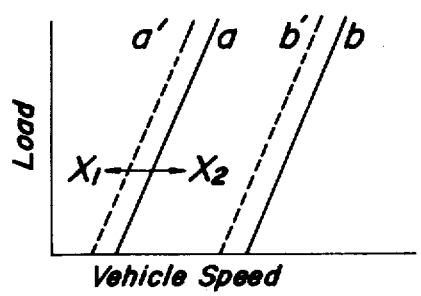
FIGS. 3a and 3b illustrate speed change lines for an automatic transmission.
Figure 3B:
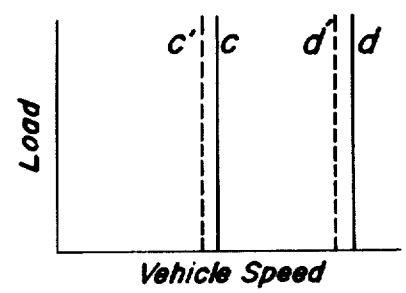
Figure 4:
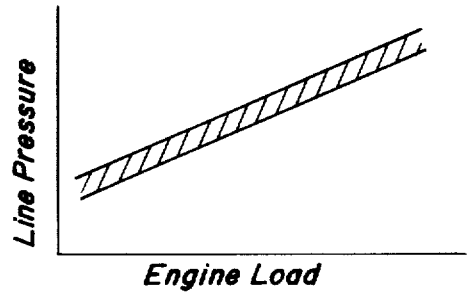
FIG. 4 is a line pressure variation characteristic diagram of an automatic transmission.
Figure 12:
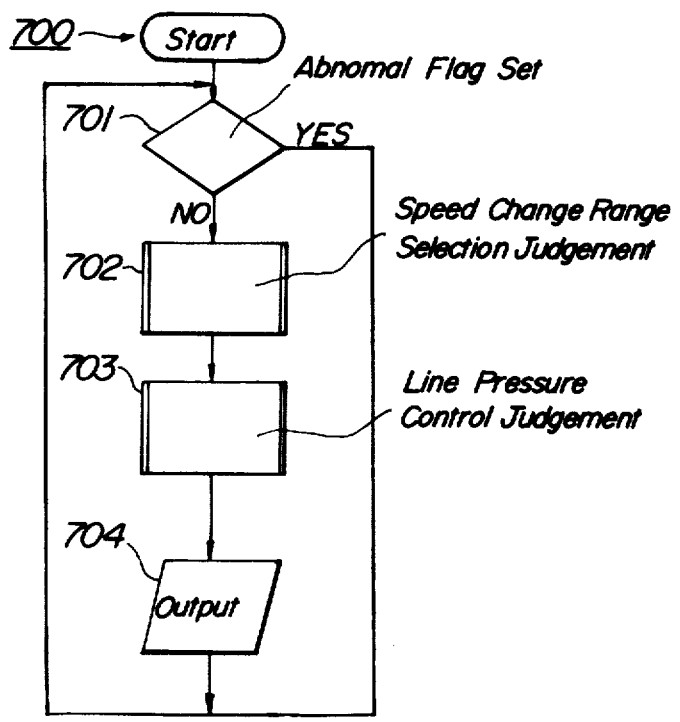
FIG. 12 is a flow chart of a control program for carrying out the same control as that of the electric control device shown in FIGS. 2-4.

FIG. 12 illustrates a flow chart for a control program 700 which performs a control similar to that of the electronic control device 208 explained referring to FIGS. 2-4. The flow chart includes a speed change range selection judgement step 702 and a line pressure control judgement step 703. In the speed change range selection judgement step 702, a speed change range is determined based on the relation between the engine load and vehicle speed as shown in FIG. 3 stored in the ROM 503 in the manner similar to the speed range selection judgement circuit 209 in FIG. 2 to set the shift solenoid control signals 141' and 142' in the RAM 502. In the line pressure control judgement step, the line pressure control signals 143' and 144' are set in the RAM 502 so as to be target line pressure values based on the relation between the line pressure and engine load as shown in FIG. 4 stored in the ROM 503 in the manner similar to the line pressure control circuit 210. The control program 700 further includes an abnormal flag detection step 701 for detecting an abnormal flag illustrating abnormal value detecting conditions of respective inputs produced from a control program 600 later described and set in a predetermined address in the RAM 502, and a step 704 for giving the PiA 505 instructions for producing signals 141'-144' set in the RAM 502 for actuating the respective solenoids 141-144.

Figure 13:
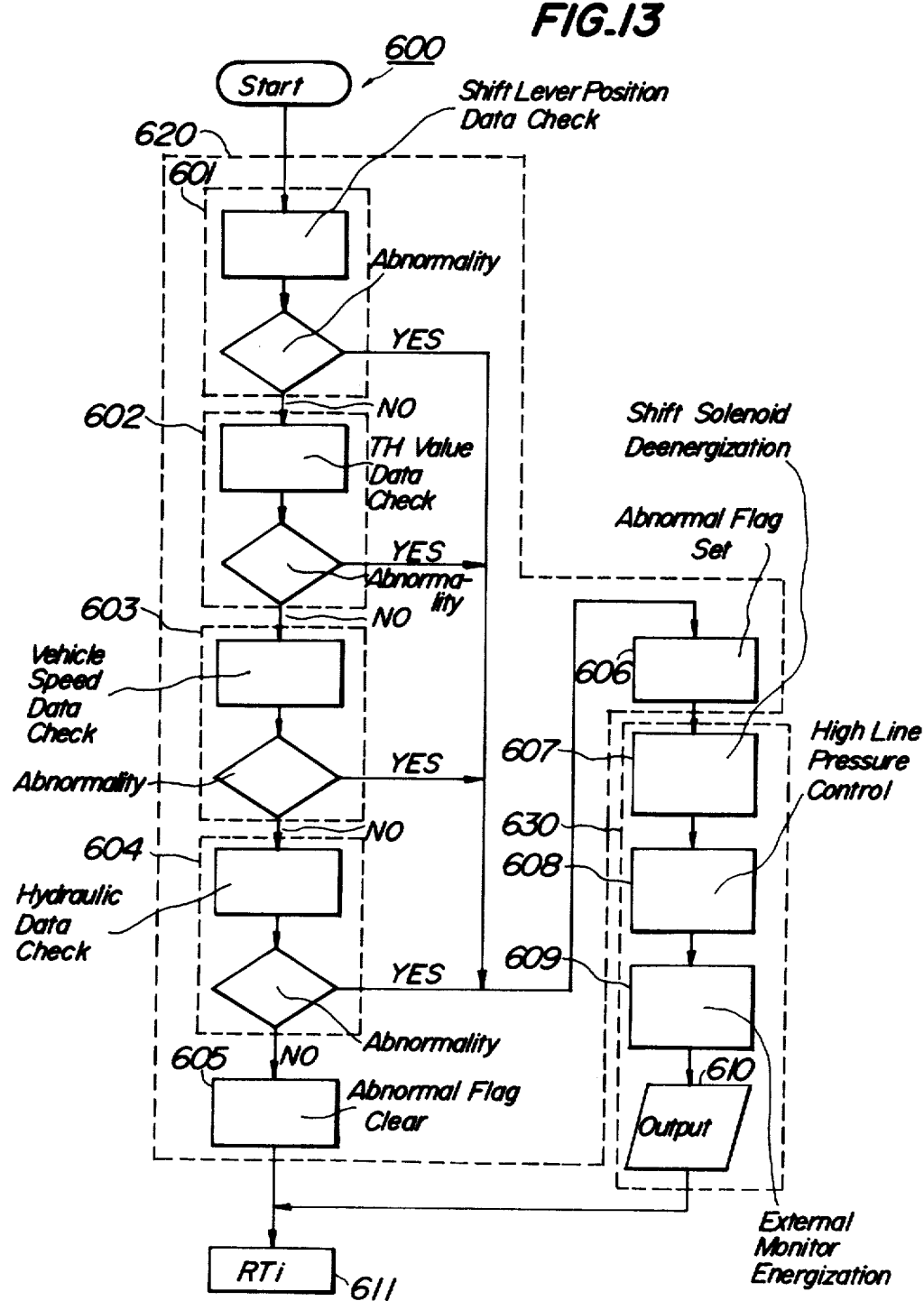
FIG. 13 is a flow chart of a control program for the device shown in FIG. 11.

When the fact that the abnormal flag has been set in the step 701 is detected a control program 600 shown in FIG. 13 is carried out without doing the steps 702-704.

The control program 600 starts its process in response to the interruption signal produced from the timer 504 at predetermined times. The process program 700 is in a rest position during an operation of the control program 600 even when either the step 702 or 703 is being carried out and the program 700 starts again at its starting position after a process of an RTi (Return from Interrupt) at the last step of the program 600.

The programs 600 and 700 may continuously carry out, for example, the process of the RTi followed by that of the step 701 to obtain the same effect. If the program 700 is often interrupted owing to the detection of abnormal values by the program 600, there is a risk of delay in the usually required selection judgement of speed change ranges and control of the line pressure because of the complicated processes in the steps 702 and 703 requiring much time therefor. In effect, therefore, it is preferable to determine the start of the program 600 by the interruption signals from the timer 504 as above described and to set the interval of the interruption signal longer enough than the process time of the program 700.

The entire control program 600 and detection of the abnormal values of the input signals 202-207 will be explained referring to FIG. 13.

The control program 600 consists of an abnormal value detection step 620 for detecting abnormal values of the respective input signals 202-207 to produce abnormal value detection signals (abnormal flags), and an abnormality treatment step 630. The step 630 produces abnormality treatment signals (abnormality treatment information) for deenergizing the shift solenoids 141 and 142 in response to the abnormal detection signal (abnormal flag), for energizing the atmosphere solenoid 144 and for actuating the monitor for indicating the abnormality for a driver. The abnormal value detection step 620 consists of a manual lever position signal abnormal value detection step 601 for picking up the respective input signals 202-207 from the respective addresses in the RAM 502 to detect the abnormal values, a throttle open degree signal abnormal value detection step 602, a vehicle speed signal abnormal value detection step 603, a line pressure signal abnormal value detection step 604, an abnormal flag set step 606 for setting abnormal value detection signals (abnormal flags) of binary signals in predetermined addresses in the RAM 502 when the abnormal values are detected in the respective abnormal value detection steps 601-604, and an abnormal flag clear step 605 for clearing the abnormal flags set in the RAM 502 when any abnormal value is not detected in the abnormal value detection steps 601-604. On the other hand, the abnormality treatment step 630 consists of a shift solenoid deenergization treatment step 607 for setting in the RAM 502 the shift solenoid control signals 141' and 142' for deenergizing the shift solenoids 141 and 142, a high line pressure control treatment step 608 for setting in the RAM 502 the line pressure control signals 143' and 144' for energizing the atmosphere solenoid 143 and deenergizing the negative pressure solenoid 144, an external monitor operation treatment step 609 for setting in the RAM 502 the signal 506' for actuating the monitor for warning of the abnormality to the driver, and an output step 610 for producing through the PiA 505 the signals set in the respective addresses in RAM 502 in the respective steps 607-609. The effects of the deenergization of the shift solenoids 141 and 142, energization of the atmosphere solenoid 143 and deenergization of the negative pressure solenoid 144 will not be described because they are similar to those of the embodiments in FIGS. 1-10.

The external monitor 506 is an acoustic and/or visual one for warning of the abnormality for the driver with the aid of signals from the PiA 505. A buzzer, bell or the like or sound reproduced from a tape or other generated warning or visual warning or a combination of these warnings may be used for this purpose.

The respective abnormal value detection steps 601-604 of the control program 600 will then be explained in detail. In this case, the control program 600 starts the process in response to the interruption signal at for example interval $\Delta$. The respective abnormal value detection steps 601-604 are not always required to detect the abnormal values at all the intervals but may detect the values at intervals $a\Delta$, $b\Delta$, $c\Delta$ and $d\Delta$ (where a, b, c and d are positive integral numbers), respectively. The input signals 202, 203, 204, 205, 206 and 207 are sampled every determined time and stored in respective predetermined addresses in the RAM 502. The periods for the sampling of the input signals 202, 203 and 204 are $\Delta a$ and for the input signals 205, 206 and 207 are $\Delta c$, $\Delta b$ and $\Delta d$, respectively.

Figure 15:
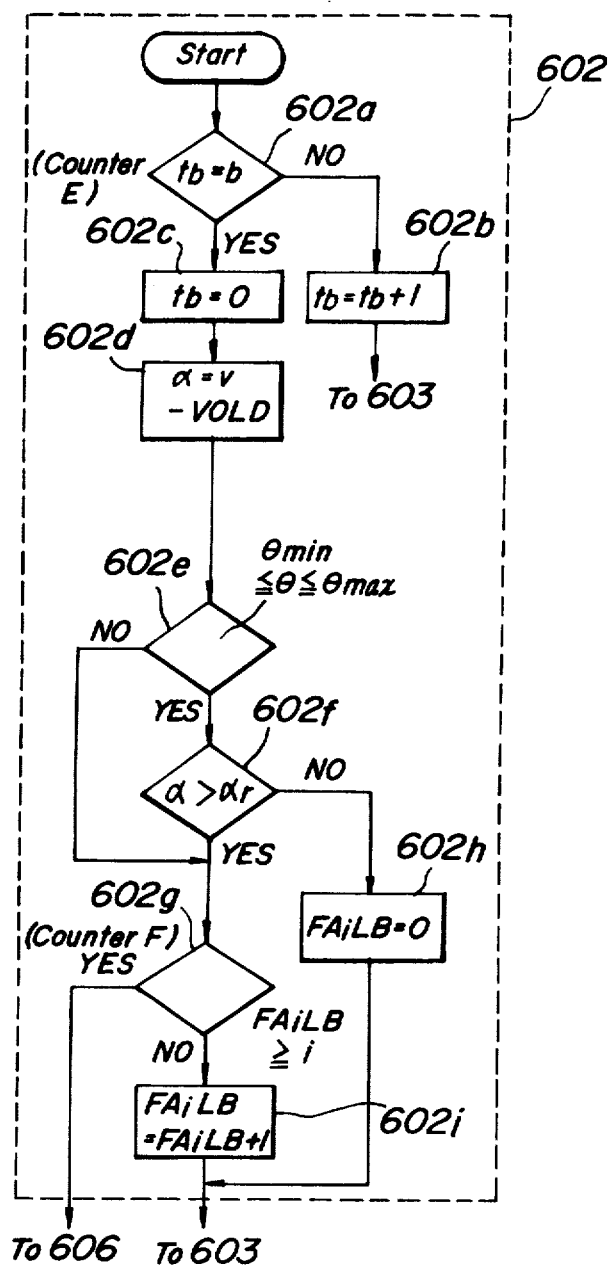
FIG. 15 is a detailed flow chart of a throttle open degree signal abnormal value detection step in FIG. 13.
Figure 17:
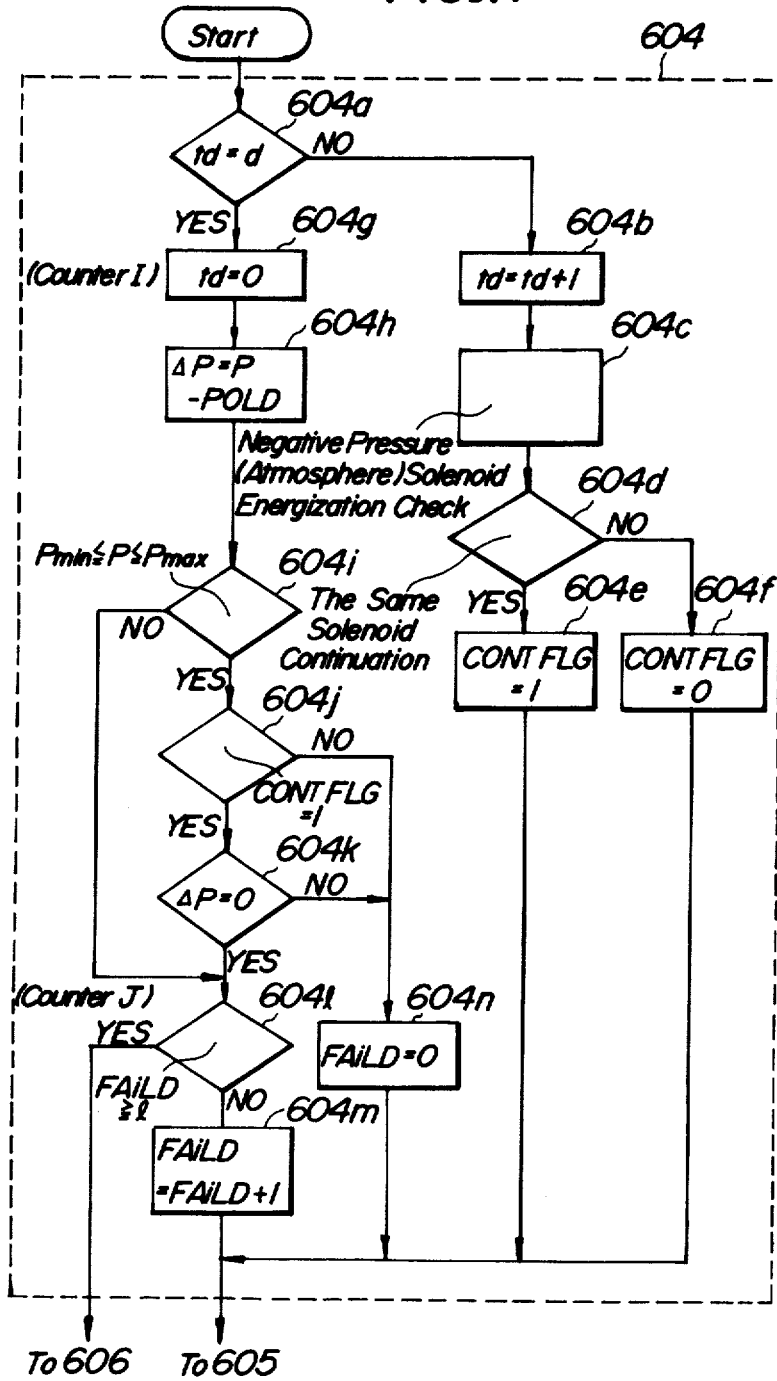
FIG. 17 is a detailed flow chart of a line pressure signal abnormal value detection step in FIG. 13.

The vehicle speed signal 205 and line pressure signal 207 later described referring to FIGS. 15 and 17 are stored in the following manner in view of the abnormal value detection in the abnormal value detection steps 602 and 604. The signals 205 and 207 are sampled every time $\Delta c$ and $\Delta d$, respectively. The RAM is provided with two addresses for each signal 205, or 207, in which a new value v or p of the signal 205 or 207 and an old value V' or p' of the signal in the preceding sampling period and they are updated every sampling period $\Delta c$ or $\Delta d$.

Figure 14:
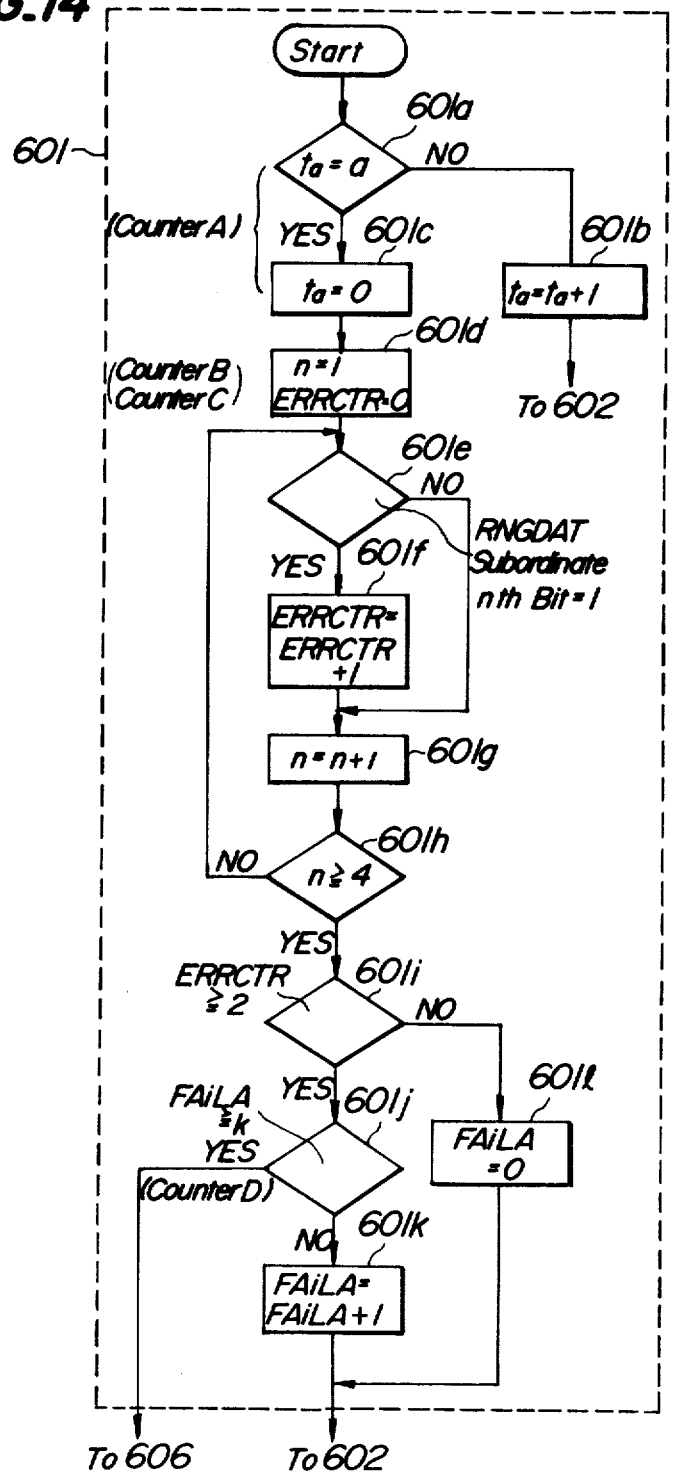
FIG. 14 is a detailed flow chart of a manual lever position signal abnormal value detection step in FIG. 13.

FIG. 14 illustrates a detailed flow chart of the manual lever position signal abnormal value detection step 601. In this step 601, five predetermined addresses in the RAM 502 are used as counters A, B, C and D. The counter A is used to determine the period for detecting every time $a\Delta$ the abnormal value of the manual lever position stored in the RAM 502 every the predetermined sampling period $\Delta a$. In other words, upon receipt of the interruption signals from the timer 504 every time $\Delta$, whether the counted value of the counter A is a or not is determined in the step 601a. If the value is not a, the process proceeds into a step 601b in which the counted value is added with "1" and the process proceeds further into the step 602. If the counted value is a, the process proceeds in to a step 601c in which the counted value is reset "0" and the process proceeds further into a step 601d. Namely, the abnormal value detection every time $a\Delta$ is effected in such a manner that the step 601d is not effected until the interruption signals are received a times. In step 601d, the two counters B and C are used. In the same manner as those described in connection with FIGS. 1-10, the counter B is used to select an nth bit (in this embodiment, n is 1, 2 or 3) of a determined address in the RAM 502 in which each manual lever position signal 202'-204' is stored such that a signal corresponding to the range selected from the D, II and I ranges becomes "1". On the other hand, a counted value of the counter C indicates the number of the manual lever position signals 202-204 which are "1".

In the step 601d, the counted value of the counter B is set in 1 (one) and the counted value of the counter C is set in 0 (zero). In a next step 601e, it is detected whether the manual lever position signal of the nth bit (for example, the signal 202, 203 or 204, if n is one, two or three.) is "1" or not. If the signal is "1", the step proceeds to the step 601f. If the signal is not "1", the step proceeds to the step 601g. In the step 601f, the counted value of the counter B is added with one. In the step 601g, the counted value of the counter A is added with one.

In a step 601h, it is detected whether the counted value of the counter A is four or more or not. If it is less than 4, the step returns to the step 601e, so that a cycle of the steps 601e, 601f, 601g and 601h is repeated until the counted value of the counter A becomes 4 or more. With this repetition of the cycle, all the signals 202-204 are judged in the step 601e whether they are "1" or not. When the counted values of the counter A becomes four or more in the step 601h, the step proceeds to the step 601i in which the counted value of the counter B is judged whether it is two or more. In this case, if the counted value of the counter C is two or more, it indicates that the manual lever assumes two positions simultaneously, and therefore the fact that the manual lever position signal 202-204 are abnormal values are detected as above described.

In order to avoid the transitional conditions of the signals 202-204 in the same manner as above described in connection with FIGS. 1-10, the counter D is used in the step 601j. The counted value of the counter D is judged whether it is determined value k or more in a step 601j. When it is k or more, the step proceeds to a step 606 wherein the abnormal flag is set as above described to carry out the abnormality treatment step 630. As can be seen from the above description, the step proceeds to the step 601j only every $3a\Delta$ time even if the manual lever position signals 202-204 continue to be abnormal values. Accordingly, when the signals continued to be abnormal values for the time of $k.3a\Delta$, the step proceeds to the step 606. When the counted value of the counter D is less than k, the step proceeds to the step 601k wherein the counted value is added with one and then proceeds to the throttle open degree signal abnormal value detection step 602. When the counted value of the counter C is less than two, the step proceeds to the step 601l wherein the counted value of the counter D is restored to zero.

FIG. 15 illustrates a detailed flow chart of the throttle open degree signal abnormal value detection step 602 shown in FIG. 13. In this step 602, two determined addresses of the RAM 502 are used as counters E and F. The counter E is used to determine the period for carrying out the step 602 in the similar manner to that of the counter A described in connection with FIG. 14. In the step 602, namely, the counted value of the counter E is judged whether it is a predetermined value b or not. If the value is less than b, the step proceeds to a step 602b, wherein the value of the counter D is added with one and, then proceeds to the vehicle speed signal abnormal value detection step 603. If the value of the counter D is equal to b or more, the step proceeds to the step 602c, wherein the counted value of the counter E is restored to zero, and then proceeds to the step 602d. Accordingly, the abnormal value detection of the throttle open degree signal 206' is carried out every time of $b\Delta$. In the step 602d, new and old values v and v' of the vehicle signals 205 are read out with the aid of the RAM 502 to compute the vehicle speed change during the sampling period $\Delta c$, that is, an acceleration value $\alpha = v - v'$ which is then stored in a determined computing register of the central processing unit 501. Then the step proceeds to the step 602e. In this step 602e, a throttle open degree sensor 206 compares the value $\theta$ of the throttle open degree signal 206' with the maximum and minimum value $\theta_{max}$ and $\theta_{min}$. If the throttle open degree signal 206 is in a relation $\theta_{min} \leq \theta \leq \theta_{max}$, the throttle open degree sensor 206 judges the normality of the throttle open, so that the step proceeds to a step 602f. If the throttle open degree signal 206' is out of the above relation, the throttle open degree sensor 206 immediately judges the abnormality and the step proceeds to a step 602g described later. In the step 602f, a set value $\alpha_r$ of the acceleration stored in the determined address in the ROM 502 and the acceleration value $\alpha$ stored in the computing register of the central processing unit 501 are compared with each other. When $\alpha > \alpha_r$, the throttle open degree sensor 206 judges the abnormality and the step proceeds to the step 602g. When $\alpha < \alpha_r$, the throttle open degree sensor 206 judges the normality and the step proceeds to the step 602h described later.

Figure 18:
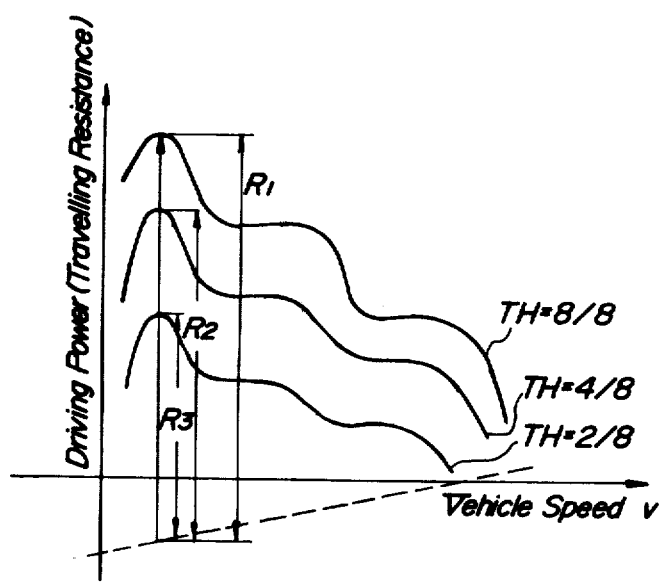
FIG. 18 is a diagram illustrating a surplus of driving power of a vehicle on a descent gradient.

The above acceleration value $\alpha_r$ is set as a value corresponding to a sufficiently high acceleration. The set acceleration value $\alpha_r$ may be a determined value. However, it is preferable to determine the value in the following manner. FIG. 18 illustrates relations between vehicle speeds and driving powers (travelling resistances) with respect to throttle open degrees, including solid lines of the driving powers with constant throttle open degrees 2/8, 4/8 and 8/8 and varying vehicle speeds and a broken line illustrating the travelling resistance corresponding to a descent gradient of 10-20% increasing with the increasing vehicle speeds. As can be seen from the FIG. 18, the lower the vehicle speed with the same throttle open degree and the larger the throttle open degree with the same vehicle speed, the greater the acceleration obtained by the vehicle is, or the greatr the surplus ($R_1$, $R_2$ and $R_3$) of the driving power is. Corresponding values to these accelerations are stored in predetermined addresses of the ROM 503. In the step 602f, a desired address is obtained by a computation with a throttle open degree and a vehicle degree to determine a set acceleration value $\alpha_4$ from the ROM 503 with the aid of the address. The set acceleration value $\alpha_r$ is set in this manner. If the throttle open degree signal 206' corresponds to an open degree smaller than the actual throttle open degree, that is, the signal 206' is an abnormal value, the actually obtained acceleration $\alpha$ is of course larger than the set acceleration value $\alpha_r$, so that the control proceeds to the step 602g to detect the abnormality. On the other hand, if the throttle open degree signal 206' corresponds to an open degree larger than the actual throttle open degree, that is, the signal 206' is an abnormal value, the relation is $\alpha \leq \alpha_r$ in the step 602f. In this case, the abnormality cannot be detected and the line pressure is controlled at a higher pressure than that required and the control of the speed change is somewhat malfunctional. However, they do not affect the vehicle travelling and do not bring about any danger in travelling.

The set acceleration value is determined on the basis of the travelling resistance corresponding to the decent gradient of 10-20% as above described. This is for the reason that there are various actual gradients of roads and it is impossible to determine the acceleration in consideration of all the gradients. Accordingly, the set acceleration value $\alpha_r$ is determined at a relatively large value to reduce a possibility of a wrong detection.

In the step 602g, the counted value of the counter F provided in the predetermined address of the RAM 502 is judged. If the counted value is equal to i or more, the step proceeds to the step 606 wherein the abnormal flag is set and the abnormality treatment step 630 is carried out. If the counted value of the counter F is less than i, the counted value is added with one in the step 602i and the step proceeds to the vehicle speed signal abnormal value detection step 603. If an abnormal value is not detected in the step 602e and further in the step 602f, the counted value of the counter F is restored to zero in the step 602h and thereafter the step proceeds to the step 603.

As can be seen from the above description, the step proceeds to the step 602d only every time of b$\Delta$, so that the step proceeds from the step 602g to the step 606 for setting the abnormal flag only every time of k.b.$\Delta$ even if the throttle open degree signal 206' continues to be an abnormal value. Accordingly, if the counted value i of the counter F is set at a large value, it is able to prevent the throttle open degree signal 206' from being detected as if it were an abnormal value, even if a frictional coefficient between tires and a road is so small that the tires intermittently slip at starting.

Figure 16:
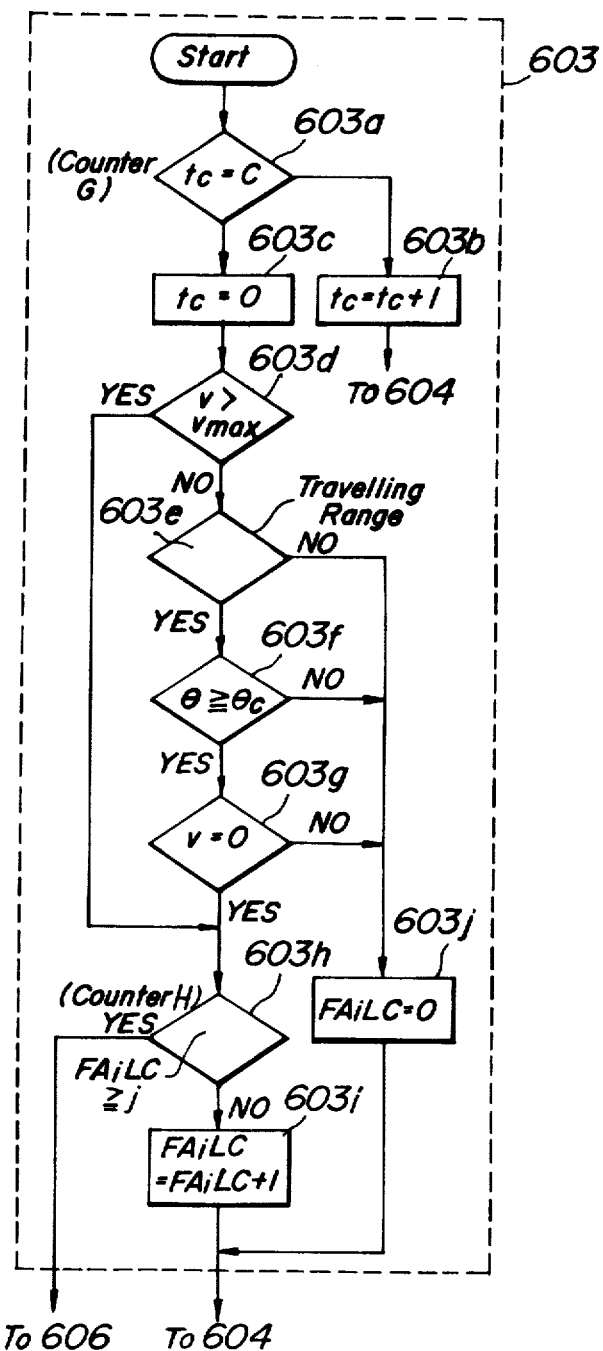
FIG. 16 is a detailed flow chart of a vehicle speed signal abnormal value detection step in FIG. 13.

FIG. 16 illustrates a detailed flow chart of the vehicle speed signal abnormal value detection step 603 as shown in FIG. 13. In this step 603, two predetermined addresses of the RAM 502 are used as counters G and H. The counter G is used to detect an abnormal value of the vehicle speed signal 205 every time of c$\Delta$, which is stored in the RAM 502 every time of the predetermined sampling period $\Delta e$. In other words, upon receipt of the interruption signal from the timer 504 every time of $\Delta$, the counted value of the counter G is judged whether it is c or not in the step 603a. If the value is not c, the step proceeds to the step 603b, wherein the counted value is added with one and further proceeds to the line pressure signal abnormal value detection step 604. If the counted value is c, the step proceeds to the step 603c, wherein the counted value is reset at zero and further proceeds to the step 603d. In the step 603d, the value $v_{max}$ corresponding to the maximum speed of the vehicle previously stored in the predetermined address of the ROM 503 is compared with the vehicle speed v stored in the RAM 503. When a relation $v > v_{max}$ is detected in this step 603d, the vehicle speed signal 205' is immediately judged to be an abnormal value and the step proceeds to a step 603h described later. On the other hand, when a relation $v < v_{max}$ is detected in the step 603d, the step proceeds to the step 603e. In the steps 603e and 603f, the conditions for the vehicle being travelling are judged with the aid of the manual lever position signals 202'-204' and the throttle open degree signal 206', which have been already detected to be not abnormal values, and the step proceeds to the step 603g. When the manual lever is in any one of forward travelling ranges D, II and I, or any one of the manual lever position signals 202'-204' is "1" signal, the step 603e proceeds to the step 603f. In cases other than this, the step proceeds to the step 603j. In the step 603f, the throttle open degree $\theta$ is compared with the predetermined value $\theta_c$ of the throttle opened degree previously stored in a predetermined address of the ROM 503. If the relation $\theta \geq \theta_c$ is detected, the step proceeds to the step 603g. If $\theta < \theta_c$ is detectedd the step proceeds to the step 603j. In this case, the predetermined value $\theta_c$ is a value corresponding to the throttle open degree in the order that the vehicle can travel sufficiently. Accordingly, when the step proceeds through the steps 603e and 603f to the step 603g, such a proceeding of the step indicates that the vehicle is under conditions for travelling. In the step 603g, the vehicle speed signal v stored in the RAM 502 is judged whether it corresponds to the vehicle speed "0" or not. When v=0 is detected or the vehicle is judged to be not travelling under the conditions for travelling judged in the steps 603e and 603f, the vehicle speed signal 205' is judged to be an abnormal value and the control proceeds to the step 603h wherein the counted value of the counter H is judged. In the step 603h, the counter value of the counter H is judged whether or not it is equal to j or more. If it is $\geq$j, the control proceeds to the step 606 wherein the abnormal flag is set. If the value is less than j, the control proceeds to the step 603i wherein the counted value is added with one and further proceeds to the line pressure signal abnormal value detection step 604. When the vehicle speed signal 205' is judged to be not an abnormal value in each of steps 603e, 603f and 603g, the counted value of the counter is set at zero in the step 603j. When the vehicle speed signal 205' is not judged to be an abnormal value continuously for the time of j.c.$\Delta$ in the above steps 603h, 603i and 603j, the control does not proceed to the step 606, so that the transitional conditions such as slips of the wheels in starting are not erroneously detected.

FIG. 17 is a detailed flow chart of the line pressure signal abnormal value detection step 604 as shown in FIG. 13. In this step 604, two predetermined addresses of the RAM 502 are used as counters I and J. The counter I is used to determine periods for detecting abnormal values of the line pressure signals 207 every time of dΔ which are stored in the RAM 502 every time of the predetermined sampling period Δd. Namely, upon receipt of the interruption signal from the timer 504 every time of Δ, the counter value of the counter I is judged whether it is d or not in the step 604a. If the counted value is not d, the step proceeds to the step 604b, wherein the counted value of the counter I is added with one, and further proceeds to the next step 604c. In the step 604c, the line pressure control signals 143′ and 144′ which have been set in the ROM 502 are derived therefrom as described in connection with FIG. 12. These signals 143′ and 144′ judge whether any one of the negative pressure solenoid 143 or atmosphere solenoid 144 is in operation or not. Upon receipt of the interruption signal from the timer 504 after the time Δ, after it is judged which one of the solenoids 143 and 144 is in operation in the step 604c through the steps 604a and 604b, the judged solenoid is compared with the solenoid which was in operation before the time Δ in the step 604d. If the compared solenoids are the same, the step proceeds to the step 604e. If they are different, it proceeds to the step 604f. Accordingly, when the negative pressure solenoid 143 or atmosphere solenoid 144 is maintained energized for more than the time of Δ, one is set in the predetermined address in the RAM 502 in the step 604e. For the sake of convenience, the value of the predetermined address is referred to as "line pressure control flag" (abbreviated as CONT FLG) hereinafter. On the other hand, if any one of the solenoids 143 and 144 is not kept energized for more than the time Δ, the value of the CONT FLG of the RAM 502 is set at zero in the step 604f. The process is carried out in the step 604e or step 604f in the above manner, the control proceeds to the step 605 shown in FIG. 13. Every receipt of the interruption signal from the timer 504, the steps 604b, 604c, 604d and 604e or 604f are repeatedly carried out. When the fact that the counted value of the counter I is d is judged in the step 604a, the control proceeds to the step 604g, wherein the value of the counter I is restored to zero, and further proceeds to the step 604h. In the step 604h, the new value P and old value P′ of the line pressure signal 207 are read out of the respective addresses of the RAM 502. The difference between the values P and P′ or variation ΔP in line pressure is temporarily stored in the computing registor of the CPU 501. In the step 604i, the line pressure signal 207 is then compared with the minimum and maximum values of the line pressure signal corresponding to the minimum and maximum values of the line pressures respectively previously stored in the predetermined addresses of the ROM 503. If the value of the line pressure signal 207 is between the minimum and maximum values, the control proceeds to the step 604j. If the value of the line pressure signal is other than between the values, the abnormality is immediately judged because the value is not one in the normal condition and the control proceeds to a step 604l described later. In the step 604j, it is judged whether the CONT FLG has been set in the above described step 604e or not whether one has been set in the predetermined address of the RAM 502. If the one has been set, the control proceeds to a step 604k. If one has not been set, the control proceeds to a step 604n described later. In the step 604k, it is judged whether the variation ΔP in line pressure obtained in the step 604h is zero or not whether the line pressure varied or not. When ΔP=0 or the line pressure did not change, the control proceeds to the step 604l. When ΔP is not zero or the line pressure changed, the control proceeds to the step 604n. In the steps 604j and 604k, the energization of any one of the negative pressure solenoid 143 and atmosphere solenoid 144 (CONT FLG=1) is judged in the step 604i even if the line pressure signal 207 is accidentally between the minimum and maximum values, and at the moment the fact that the line pressure did not change (ΔP=0) is judged in the step 604k, thereby surely judging the abnormal value of the line pressure signal 207. In the step 604l, whether the counted value of the counter J is equal to 1 or more or not is judged. If the value is equal to or more 1, the step proceeds to the step 606, wherein the abnormal flag is set and the abnormality treatment step 630 is carried out. If the counted value of the counter J is less than 1, the step proceeds to a step 604m, wherein the counted value is added with one and further proceeds to the abnormal flag clear step 605 shown in FIG. 13. A step 604n serves to restore the counted value of the counter J to zero and operates when judged to be not an abnormal value in the step 604j without passing through the step 604k in case of CONT FLG=1, and when judged to be not an abnormal value in the step 604k in case of the line pressure variation. In this case, the abnormality treatment is not carried out when judged the abnormality of the line pressure signal 207 only once through the steps 604l, 604m and 604n or the case other than that an abnormal value is continuously detected for the time of d.Δ.1, in order to avoid a misjudgement of the simultaneous rise or fall in line pressure to be an abnormality and to prevent a delay in time of variation in line pressure relative to the operation of the solenoids 143 and 144.

As can be seen from the above description, to the automatic transmission as shown in FIG. 1 is applied the abnormality treatment device for the electronic control device as shown in FIGS. 2-10 or 11-17, which, when any abnormal value occurs in respective input signals or engine load signals to be fed to the electronic control device, generates an abnormality treatment or detection signal to be introduced into the speed range selection judgment circuit and hydraulic control judgment circuit to make both the shift solenoids 141 and 142 deenergized and the atmosphere solenoid 144 energized as in the above embodiments, thereby keeping the predetermined speed range and high line pressure to prevent a misjudgement of the speed range due to the abnormal value of the input signal or engine load signal and to avoid the malfunction and danger due to the lowered line pressure above described.

According to the invention, the control of the negative pressure solenoid 143, atmosphere solenoid 144 and shift solenoids 141 and 142 may be carried out by suitable combinations of energization and deenergization different from that of the above embodiment depending upon the valves and piping associated with the solenoids for the line pressure control and speed range control in order to obtain the high line pressure and predetermined speed range. Moreover, it is clear that the present invention may be applied to an automatic transmission wherein different from that of the above embodiment the engine load signal is used only for the speed change control and the line pressure is not electrically controlled.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An abnormality treatment device for a control device for an automatic transmission including a speed change gear mechanism whose power transmission passage is connected to an output shaft of an engine and changed by means of hydraulically operated friction means to obtain a plurality of speed ranges, said treatment device including a speed range selection judgement circuit for receiving respective signals from an engine load sensor generating engine load signals corresponding to engine loads and from a vehicle speed sensor generating vehicle speed signals corresponding to vehicle speeds, comparing these signals with values corresponding to predetermined engine load and vehicle speed and determining said speed range and operation of said friction means, and a hydraulic control judgement circuit for receiving the signals from said engine load sensor to operate a hydraulic regulator valve, said treatment device comprising, in its input portion receiving the signals from said engine load sensor and said vehicle speed sensor, an abnormal value detection circuit for detecting an abnormal value of any one of said respective signals to generate an abnormal value detection signal, and an abnormality treatment circuit for producing abnormality treatment signals to be fed to said speed range selection judgement circuit and said hydraulic control judgement circuit in response to said abnormal value detection signal, thereby upon detection of the abnormal value signal, enabling said speed range selection judgement circuit and said hydraulic control judgement circuit to maintain a predetermined speed range and a predetermined high pressure, respectively.

2. An abnormality treatment device as set forth in claim 1, wherein said device further comprises position switches for respectively detecting selected positions of a manually operated valve capable of selecting one or more of said speed ranges by means of said friction means to and from which hydraulic pressure is supplied and exhausted, said abnormal value detection circuit and said abnormality treatment circuit being provided in the input portion receiving the signals from said position switches, said engine load sensor and said vehicle speed sensor, thereby upon detection of the abnormal value signal, enabling said speed range selection judgement circuit and said hydraulic control judgement circuit to maintain a predetermined high pressure and a predetermined speed range other than speed ranges which are selected by means of said manually operated valve.

3. An abnormality treatment device as set forth in claim 2, wherein said abnormal value detection circuit comprises a portion switch operation number detection circuit for judging operating conditions of said respective position switches to generate signals illustrating the number of said position switches under operative conditions, a comparator circuit for generating a signal when said position switch operation number detection circuit is detecting at least two position switches under operative conditions, and a timing circuit for generating an abnormal value detection signal when the signal from said comparator circuit continues for more than a predetermined time.

4. An abnormality treatment device as set forth in claim 1, wherein said abnormal value detection circuit comprises an engine load judgement circuit for receiving said engine load signal from said engine load sensor and comparing the signal with the maximum and minimum values of the engine load previously set therein to judge whether the engine load signal is between the maximum and minimum values, and a timing circuit for generating an abnormal value detection signal when said engine load judgement circuit continues for more than a predetermined time to produce signals illustrating that said engine load is out of a value between the maximum and minimum values.

5. An abnormality treatment device as set forth in claim 1, wherein said abnormal value detection circuit comprises an acceleration computing circuit for receiving a signal from said vehicle speed sensor to generate an acceleration signal corresponding to an acceleration, an engine load judgement circuit for receiving said engind load signal from said engine load sensor and comparing the signal with the maximum and minimum values of the engine load previously set therein to judge whether the engine load signal is between the maximum and minimum values, an acceleration judgement circuit which operates when said engine load judgement circuit judges said engine load signal to be between said maximum and minimum values to compare said acceleration signal with a signal corresponding to a sufficiently large accleration value previously set depending upon said engine load signal and generates a signal when an actual acceleration is more than said previously set acceleration value, and a timing circuit for generating an abnormal value detection signal when an signal from at least one of said engine load judgement circuit and said acceleration judgement circuit continues for more than a predetermined time.

6. An abnormality treatment device as set forth in claim 1, wherein said abnormal value detection circuit comprises a comparator circuit for comparing said vehicle speed signal from said vehicle speed sensor with a signal corresponding to the maximum vehicle speed to generate a signal when the former signal is more than the latter signal and a timing circuit for generating an abnormal value detection signal when said signal from said comparator circuit continues for more than a predetermined value.

7. An abnormality treatment device as set forth in claim 1, wherein said device further comprises a manually operated valve capable of selecting one or more said speed ranges by means of said friction means to and from which hydraulic pressure is applied and exhausted, and position switches for detecting selected positions of said manually operated valve, and further comprises a position judgement circuit for generating a signal when said position switch judges said valve to be in a position enabling a vehicle to run, an engine load judgement circuit for judging said engine load to be more than a predetermined value to generate a signal, a vehicle speed judgement circuit for judging said vehicle speed signal to be a value substantially illustrating a stoppage of said vehicle to generate a signal, and a timing circuit generating an abnormal value detection signal when all these circuits continue to generate the signals for more than a predetermined time.

8. An abnormality treatment device as set forth in claim 1, wherein said device comprises a line pressure control device for receiving respective signals from the engine load sensor generating engine load signals corresponding to engine loads and from a line pressure sensor generating line pressure signals corresponding to line pressures hydraulically operating said friction means, comparing these signals with values corresponding to predetermined engine load and line pressure and actuating a line pressure regulator valve, and said line pressure control device comprises a line pressure judgement circuit block for receiving said line pressure signals and comparing these signals with the minimum and maximum line pressure values to judge the line pressure signal whether it is between said minimum and maximum values, and a timing circuit block for generating an abnormality judgement signal when said line pressure judgement circuit block continues to generate a signal illustrating the fact that said line pressure is not between said minimum and maximum values.

9. An abnormality treatment device as set forth in claim 1, wherein said device comprises a line pressure control device for receiving respective signals from the engine load sensor generating engine load signals corresponding to engine loads and from a line pressure sensor generating line pressure signals corresponding to line pressures hydraulically operating said friction means, comparing these signals with values corresponding to predetermined engine load and line pressure and actuating a line pressure regulator valve, and said line pressure control device comprises a line pressure judgement circuit block for receiving said line pressure signals and comparing these signals with the minimum and maximum line pressure values to judge the line pressure signal whether it is between the said minimum and maximum values, a line pressure regulator valve operation detection circuit for detecting a continuation of operation of said line pressure regulator valve for more than a predetermined time and generating a line pressure regulator valve operation signal, a line pressure variation detection circuit block for receiving the signals from said line pressure sensor to detect variations in line pressure for a predetermined time, a detection circuit block for generating line pressure regulator valve operation signals when the line pressure signals is between the minimum and maximum values and detecting no variation in line pressure to generate a signal, and a timing circuit block for generating abnormality judgement signals when said signal from said detection circuit block continues for a predetermined time.

* * * * *